Figure 1:
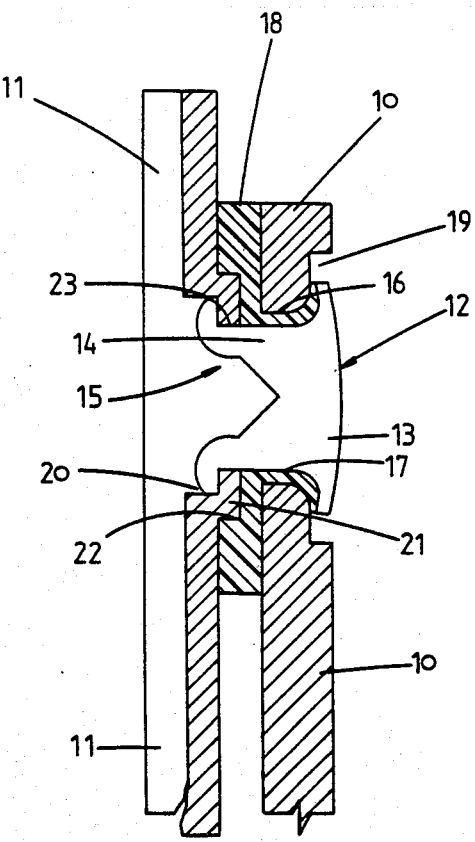

United States Patent [19]

Davis

[11] 4,441,835

[45] Apr. 10, 1984

[54] PIVOT JOINTS

[75] Inventor: Ronald P. Davis, Wellington, New Zealand

[73] Assignee: Interlock Industries Limited, Wellington, New Zealand

[21] Appl. No.: 357,194

[22] Filed: Mar. 11, 1982

[30] Foreign Application Priority Data

Mar. 12, 1981 [NZ] New Zealand .................. 196479

[51] Int. Cl.³ .............................................. F16B 19/00
[52] U.S. Cl. ...................................... 403/24; 403/162
[58] Field of Search ............... 403/162, 161, 227, 225, 403/408, 24

[56] References Cited

U.S. PATENT DOCUMENTS

| | | | |
|---|---|---|---|
| 1,892,943 | 1/1933 | Geyer | 403/225 X |
| 2,964,341 | 12/1960 | Doyle et al. | 403/162 |
| 3,328,072 | 6/1967 | Adamski | 403/162 X |
| 3,561,792 | 2/1971 | Cycowicz | 403/162 X |

FOREIGN PATENT DOCUMENTS 620882 3/1949 United Kingdom ................ 403/227

Primary Examiner—Andrew V. Kundrat

Attorney, Agent, or Firm—Young & Thompson

[57] ABSTRACT

A friction pivot joint where a headed fastening couples two components by passing through aligned openings in the components and having structure for preventing axial movement of the tail of the fastening. The joint is characterized by the shank of the fastening extending through a bushing of wear resistant plastics material located in the opening in one component. The bushing has integrally formed therewith a peripheral flange and the flange is sandwiched between the two components thereby preventing contact between the components. Friction in the joint is created from the plastics bushing and integral peripheral flange being placed under pressure by the fastening. The bushing has a length which is greater than the length of the opening in which it is located with the result that during assembly of the joint pressure created by the fastening causes the free end of the bushing to flow under the head of the fastening to be retained thereunder by retaining structure. The head and shank of the fastening are thus prevented from contacting that one component so that during relative pivotal movement of the component substantially no torque is applied to the shank by the head of the fastening.

11 Claims, 2 Drawing Figures

PIVOT JOINTS

This invention relates to a friction pivot joint and more particularly a friction pivot joint which is useful for the construction of window stays.

In our New Zealand Patent Specification No. 144922, there is disclosed a window stay construction which incorporates a friction pivot joint. The pivot joint is of such a construction that a high degree of friction is set up in each of the joints coupling the arms to the sash and frame mounting plates. The friction in the joints permit the controlled opening and closing of a window sash with the stay supporting the sash in any desired position of opening. According to the construction disclosed in the aforesaid Patent Specification the friction joint includes element(s) of wear resistant plastics material which are placed under pressure by a rivet which is utilised to pivotally couple the arm to a sash/frame mounting plate. With such joints providing a high degree of friction a pair of stays, each of compact dimensions, can be used to carry a window sash which hitherto would have required stays of substantially larger dimensions where the geometry of the stays rather than the friction in the pivot joints would be relied on to hold the sash in the desired open position.

With such a friction joint it is desirable to avoid metal to metal contact between moving parts so as to prevent binding of the joint and thus wear in the joint. This is especially so where the sash and frame mounting plates, the arms and the rivets are formed from aluminum alloy. Accordingly New Zealand Patent Specification No. 144922 teaches that wear resistant plastics material, which is preferably nylon, is placed between the mounting plate and arm on the one hand and under the head of the rivet on the other hand. To prevent contact between the shank of the rivet and the arm the wear resistant plastics material is forced during assembly into a small clearance around the shank of the rivet. To prevent wear at the tail of the rivet it is locked into the arm in which it is located so as to prevent rotational movement thereof.

The tail of the rivet must be locked in such a way that the tail resists any torque which is applied to the shank of the rivet during movement of the arm relative to the mounting plate. This torque can arise for example from the presence of corrosion under the head of the rivet which increases the frictional contact between the arm and the head of the rivet. In the aforesaid Patent Specification it is proposed that a lock washer be used for the purpose of locking the tail of the rivet though it is also proposed that the tail of the rivet can be serrated so as to lock into the arm or mounting plate.

Unfortunately problems arise with such arrangements. One of the main problems arising from the use of a lock washer is that an additional element is incorporated in the pivot construction and this can lead to increase in manufacturing costs. Serration of the tail of the rivet does not provide a permanent locking of the tail with the result that in time the tail of the rivet can work loose.

A proposal to overcome this problem is disclosed in our New Zealand Patent Specification No. 162919 where the tail of the rivet is located in a square opening in the mounting plate or arm. The tail of the rivet is then deformed so as to force a change in cross section in the shank of the rivet where it passes through the square as well as to crimp over the end of the shank. The arrangement whilst satisfactorily locking the tail of the rivet does create other problems. For example during the deformation of the tail of the rivet bulging of the shank can occur which causes binding within the joint.

The present invention has as one of its objects to provide a friction pivot joint which overcomes these problems by having a construction in which lack of torque applied to te head of the rivet results in the need to lock the tail of the rivet being not strictly necessary. The construction of the joint according to the present invention is such that little or no torque is applied to the shank of the rivet by the head even though the rivet still performs its dual function of pivotally coupling the component together and placing the wear resistant plastics material under sufficient pressure to set up the high friction level necessary to form an effective friction joint. This is achieved by isolating the head and the shank of the rivet adjacent the head from the relative movement of the components.

According to a broad aspect the invention provides a friction pivot joint between two components, said joint being of the type in which a first of the components has an opening through which the shank of a headed fastening extends, the tail of said shank extending through an axially aligned opening in the second of the components, the tail of said shank having means to prevent axial movement of said fastening relative to said components, the joint being characterised in that the shank of the fastening extends through a bushing of wear-resistant plastics material located in the opening in the first component, said bushing having integrally formed therewith a peripheral flange, said flange being sandwiched between said first and second components thereby preventing contact between the components, friction in said joint being created from the plastics bushing and integral peripheral flange being placed under pressure by said fastening, said bushing having a length which is greater than the length of the opening in which it is located with the result that during assembly of the joint pressure created by said fastening causes the free end of the bushing to flow under the head of the fastening to be retained thereunder by retaining means, said head and shank of the fastening thereby being prevented from contacting said first component so that during relative pivotal movement of said components substantially no torque is applied to the shank by the head of the fastening.

Surprisingly it has been found that it is not necessary to lock the peripheral flange against rotational movement, however, in a preferred form of the invention means are provided to prevent rotational movement of the peripheral flange about the axis of said shank during relative pivotal movement of the components. These means can take different forms. For example the peripheral flange can have an angular recess which engages with a similarly shaped projection on the second component.

As with the pivot joint disclosed in our New Zealand Patent Specification No. 144922 the wear resistant plastics material is placed under such pressure that it tends to cold flow with the result that containment of the material under at least the head of the fastening by the retaining means is necessary to achieve the desired friction level. The retaining means can take the form of a recess in the first component in which the head of the fastening is located the recess being of a diameter which is substantially the same as the diameter of the head of the fastening.

The present invention also provides a novel form of containment of the wear resistant plastics material under the head of the fastening. The containment is achieved by forming a concave underside to the head of the fastening. This arrangement has the advantage that a clearance can be left between the peripheral edge of the head of the fastening and a counter bore in the component of which the head is located. However, as the wear resistant plastics material is retained entirely by the head, recessing of the head of the fastening is not strictly necessary though it is desired when the pivot joint is being used in a window stay so as to keep the depth of the stay as compact as possible.

Figure 2:
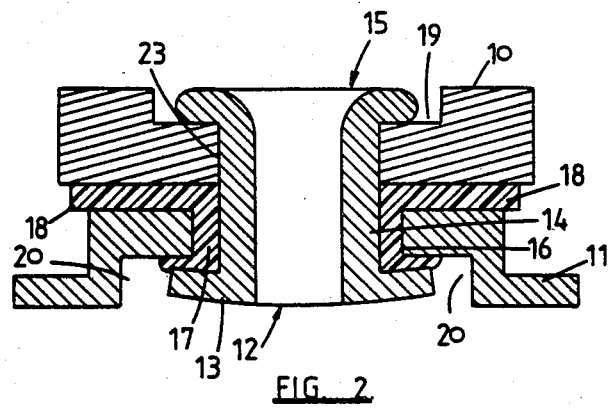

To more fully describe the invention reference will be made to the accompanying drawings in which:

FIG. 1 is a cross sectional view through one preferred form of the friction pivot joint, and FIG. 2 is a similar view but showing a second preferred form.

Referring firstly to FIG. 1 the pivot joint is shown by way of example as coupling an arm 10 of a window stay to a mounting plate 11. Arm 10 is coupled to plate 11 by a rivet 12 which has a head portion 13, a shank 14 and tail portion 15. In the preferred form rivet 12 is formed of an aluminium alloy.

Shank 14 extends through an opening 16 in arm 10 and separating shank 14 from the peripheral surface of opening 16 is a bushing 17 of a wear resistant plastics material (preferably nylon). Bushing 17 is formed integrally with a peripheral flange 18 which is located between arm 10 and mounting plate 11 so as to separate these components. Bushing 17 is of tubular form but is deformed from a substantially T shape cross section into an H shape cross section as shown in FIG. 1 during assembly of the pivot joint as will hereinafter be described.

In the form illustrated the head 13 of rivet 12 is located within a recess 19 in arm 10. This recess is preferably in the form of a counter bore coaxial with opening 16. In like manner tail 15 is located within a recess 20 in mounting plate 11.

Recess 20 can be conveniently obtained by deforming mounting plate 11 so that a projection 21 extends from the surface of the mounting plate. It is preferred that this projection be of angular cross section so as to fit into a recess 22 of complementary cross section in flange 18. This ensures that in the assembled joint flange 18 is not able to rotate.

The pivot joint is assembled by placing the bushing 17 within opening 16. Rivet 12 is then inserted into bushing 17 with the tail 15 located through opening 23 to be situated within recess 20. The joint is then completed by pressing over tail 15 into recess 20 which draws head 13 toward arm 10 thus causing the free end of flange 17 to be deformed as shown. The wear resistant plastics material is thus placed under pressure as a result of the rivetting operation and the desired level of friction is accordingly set up in the joint.

Because of the pressure applied to the wear resistant plastics material it tends to cold flow but only at the free end of the bush 17. No cold flowing of flange 18 takes place primarily due to the larger cross sectional area of the flange and the thickness thereof. To control the cold flowing of the plastics material it must be retained and this can be effected in the manner disclosed in our New Zealand Patent Specification No. 144922 by having the diameter of the head of the rivet substantially the same as the diameter of the recess in the arm so as to form a housing to retain the plastics material from cold flowing out of the joint which would result in a loss of friction.

The present invention, however, provides a novel means of containment of the nylon under the head of the rivet. This is achieved by the underside of the head 13 being of concave shape so that the recess in which the plastics material is retained is formed as part of head 13. Accordingly recess 19 in arm 10 can be of substantially greater cross sectional dimensions than that of the head 13. The concave underside can be formed by a concave recess in the underside or by the head being deformed into a concave/convex O shape (as shown) during pressing.

With a friction pivot joint constructed according to the invention little or no torque is applied by the head of the rivet and accordingly there is no need to lock the tail of the rivet. The fact that no torque is applied to the tail of the rivet arises from the bush 17 and flange 18 being formed integrally and not moving during relative movement between the arm and mounting plate. As no torque is applied to the rivet it can equally be replaced by a screw and nut as losening of the screw does not occur due to the screw being isolated from movement of the arm. With a screw and nut forming the fastening adjustability of the friction level becomes possible. In view of the containment of the wear resistant plastics material under the head of the rivet, recessing of the head is not strictly necessary though in window stay manufacture it is desirable to ensure that the thickness of the window stay is kept to a minimum.

The joint is open to modification and a second preferred embodiment is shown in FIG. 2 where the components of the joint have the same reference numerals as used in FIG. 1. In this form of the joint tail 15 of rivet 12 is located in recess 19 in arm 10 whilst head 13 is located in recess 20 in mounting plate 11. With this form it is necessary to lock tail 15 into arm 10 as the arm is in use moved relative to plate 11. Locking is achieved by making opening 16 non-round. As head 13 and shank 14 are isolated from plate 11 no torque is applied to head 13 during movement of arm 10 thus the amount of deformation of tail 15 to achieve locking to arm 10 does not cause the bulging of the shank of the rivet which has hitherto been a problem.

What is claimed is:

1. A friction pivot joint between two components, said joint being of the type in which a first of the components has an opening through which the shank of a headed fastening extends, the tail of said shank extending through an axially aligned opening in the second of the components, the tail of said shank having means to prevent axial movement of said fastening relative to said components, the joint being characterised in that the shank of the fastening extends through a bushing of wear-resistant plastics material located in the opening in the first component, said bushing having integrally formed therewith a peripheral flange, said flange being sandwiched between said first and second components thereby preventing contact between the components, friction in said joint being created from the plastics bushing and integral peripheral flange being placed under pressure by said fastening, said bushing having a length which is greater than the length of the opening in which it is located with the result that during assembly of the joint pressure created by said fastening causes the free end of the bushing to flow under the head of the fastening to be retained thereunder by a concave underside of the head of the fastening, said head and shank of the fastening thereby being prevented from contacting said first component so that during relative pivotal movement of said components substantially no torque is applied to the shank by the head of the fastening.

2. A friction pivot joint as claimed in claim 1 wherein the concave underside is a concave recess formed in the said underside.

3. A friction pivot joint as claimed in claim 1 wherein the concave underside is formed by the head of the fastening being of concave/convex shape.

4. A friction pivot joint as claimed in claim 3 wherein the concave/convex shape is obtained by deformation of the head during assembly of the joint.

5. A friction pivot joint as claimed in claim 1 further including locking means which locks the peripheral flange against rotational movement.

6. A friction pivot joint as claimed in claim 5 wherein the locking means is an angular projection from said second component which is lockingly engaged in a shaped recess in said peripheral flange.

7. A friction pivot joint as claimed in claim 1 wherein the first component is a mounting plate of a window stay and the second component is an arm thereof, said fastening being a rivet with the tail thereof located through a non-round opening in said arm.

8. A friction pivot joint as claimed in claim 1 wherein the first component is an arm of a window stay and the second component is a mounting plate thereof, the tail of said fastening being located through a circular opening in said mounting plate.

9. A friction pivot joint as claimed in claim 1 wherein the head of the fastening and the means preventing axial movement of the tail thereof are located in recesses in said first and second components.

10. A friction pivot joint as claimed in claim 1 wherein the wear resistant material is nylon.

11. A window stay for the adjustable mounting of a window, said stay having a sash mounting plate and a window frame mounting plate with an arm pivotally coupled at each end to a respective frame and sash mounting plate, said pivotal coupling being formed by a friction pivot joint as claimed in claim 1.

* * * * *